G. LAQUAI.
COOKING APPARATUS WITH WATER BATH.
APPLICATION FILED MAY 20, 1918.
1,299,963.
Patented Apr. 8, 1919.
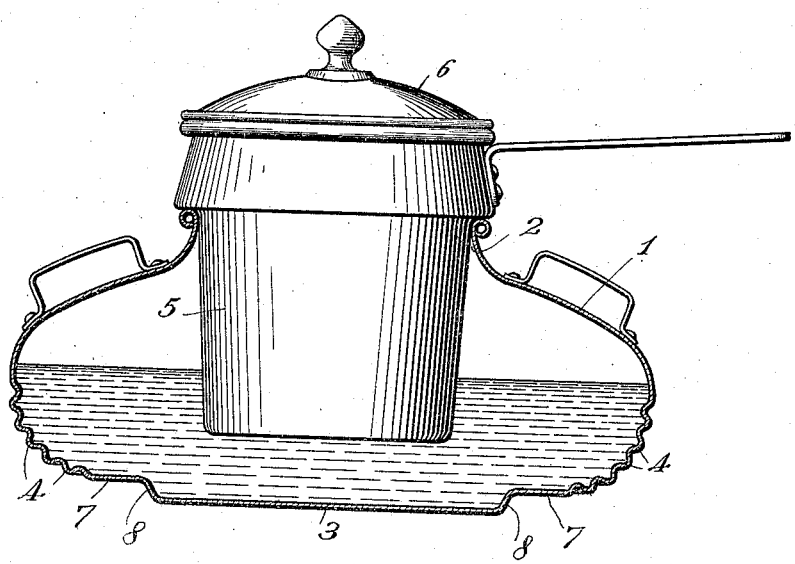
Inventor:
George Laquai,
By Hemworth Jr.
Atty.

UNITED STATES PATENT OFFICE.

GEORGE LAQUAI, OF ZURICH, SWITZERLAND.

COOKING APPARATUS WITH WATER-BATH.

1,299,963. Specification of Letters Patent. Patented Apr. 8, 1919.

Application filed May 20, 1918. Serial No. 235,531.

*To all whom it may concern:*

Be it known that I, GEORGE LAQUAI, a citizen of the Republic of Switzerland, residing at Zurich, Switzerland, have invented certain new and useful Improvements in Cooking Apparatus with Water-Bath; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a cooking-apparatus with water-bath.

The object of the invention is to provide a cooking-apparatus with a water-bath comprising a water-vessel consisting of a single piece of sheet-metal which, starting at an upper central aperture, is strongly bulged out sidewise and which is vaulted outward from its greatest width in the direction toward the bottom, the vaulted wall portion being provided with undulations extending around about its circumference so that a meridian cross section through said vaulted vessel portion has the shape of a curve provided with undulations. The cooking-apparatus according to this invention comprises further a cooking-vessel projecting into the water-bath and fitting in the central aperture of the water-vessel, said cooking-vessel being for the reception of the food to be cooked.

This invention will now be more particularly described with reference to the accompanying drawing illustrating a vertical cross-section through a constructional example of the invention.

Referring to the drawing, 1 denotes a water-vessel made of a single piece of sheet-metal and having an upper central aperture 2. Starting at the aperture 2, the vessel 1 is strongly bulged out sidewise. The vessel 1 has a bottom comprising a middle portion 3 and an adjacent outer portion 7, the two portions 3, 7 being connected by a shoulder 8.

Into the wall portion of the vessel 1 which is vaulted outward and which lies between the vessel portion having the greatest width and the bottom portion 7 are pressed a plurality of undulations 4 extending around about the vessel and imparting to the meridian cross-section through said vessel portion the shape of a curve having undulations. 5 denotes a cooking-vessel resting by means of a shoulder on the upper rim of the vessel 1 and projecting into the latter. The cooking-vessel 5 is closed by means of a cover which fits in the aperture 2 of the water-vessel 1.

When the water-vessel 1 of the hereinbefore described cooking-apparatus is put on a cooking-stove or on a cooking-pot, the water contained in the vessel 1 is heated. The cooking-vessel 5 can be removed, the cover 6 being then put on the vessel 1. When the cooking-vessel 5 is inserted into the water-vessel 1, the water contained in the latter heats the food contained in the vessel 5 extending partly into said water or prepares it for a further treatment.

It has been found that the undulations 4 do not only increase the strength of the vessel 1 but increase also the utilization of the heat contained in the gases coming in contact with the vessel 1, as said undulations have the effect to keep the gases in contact with the wall of the vessel 1 while they stream upward. The utilization of heat is also improved in consequence of the peculiar shape given to the bottom 3, 7, 8 and to the part lying between the bottom portion 7 and the greatest width of the vessel 1, the shape of said part having the effect to deviate the heating gases in the most advantageous manner from the bottom 3, 7, 8 toward the side wall of the vessel 1. Also the strongly bulged upper portion of the vessel 1 has the effect to improve the heating effect, as the surface coming in contact with the water is greater than in the case in which the upper portion of the vessel 1 would be arranged at right angles to its side portion.

I claim:

1. A water-bath cooking apparatus, comprising a water vessel having a central opening, said vessel being, starting from the central opening and extending downwardly to its maximum diameter, strongly bulged out sidewise and vaulted outward from its maximum diameter toward the bottom, this lower vaulted portion being provided with circumferential undulations and imparting to the meridian section of said portion of the vessel the form of a curve provided with undulations, and a cooking vessel adapted to fit into the central opening of the water vessel and to receive the food to be cooked over the water-bath.

2. A water-bath cooking apparatus, comprising a water vessel having a central opening, said vessel starting from the central opening and extending downwardly to its maximum diameter being strongly bulged out sidewise and vaulted outward from its maximum diameter toward the bottom, this lower vaulted portion being provided with undulations running around it and imparting to the meridian section of said portion of the vessel the form of a curve provided with undulations, and the bottom of the water vessel having a central downwardly projecting part and an outer part lying in a different horizontal plane and connected to said central part by means of a shoulder, a cooking vessel fitting in said central aperture and provided with a shoulder adapted to rest on the upper rim of the water-vessel, and a removable cover adapted to fit in the cooking vessel as well as in the central aperture of the water vessel.

3. A water-bath cooking utensil comprising a water vessel having an open top, a flat bottom having a shouldered offset from the lower body portion of the vessel, said body portion having a plurality of corrugations sinuous in section below the greatest diameter of said vessel, and a cooking vessel arranged to seat in the open top and a removable cover arranged to fit both the cooking vessel and the water vessel.

In testimony that I claim the foregoing as my invention, I have signed my name.

GEORGE LAQUAI.

Copies of this patent may be obtained for five cents each, by addressing the "Commissioner of Patents, Washington, D. C."